United States Patent [19]
Lippert, Jr.

[11] 3,960,345
[45] June 1, 1976

[54] MEANS TO REDUCE AND/OR ELIMINATE VORTICES, CAUSED BY WING BODY COMBINATIONS

[75] Inventor: Joseph Lippert, Jr., Locust Valley, N.Y.

[73] Assignee: Grumman Aerospace Corporation, Bethpage, N.Y.

[22] Filed: May 16, 1975

[21] Appl. No.: 578,199

[52] U.S. Cl. .............................. 244/130; 244/41; 244/54
[51] Int. Cl.² ...................... B64C 3/58; B64C 7/02
[58] Field of Search .......... 244/12 CW, 40 R, 40 A, 244/41, 91, 130, 42 CC; D12/80, 81

[56] References Cited
UNITED STATES PATENTS

| | | | |
|---|---|---|---|
| 2,687,262 | 8/1954 | Custer | 244/12 CW |
| 2,994,493 | 8/1961 | Hartman | 244/12 CW |
| 3,129,906 | 4/1964 | Peterson | 244/130 |
| 3,704,842 | 12/1972 | Custer | 244/12 CW |
| 3,744,745 | 7/1973 | Kerker et al. | 244/41 |
| D232,927 | 9/1974 | Blattner et al. | 244/42 CC |

FOREIGN PATENTS OR APPLICATIONS

| | | | |
|---|---|---|---|
| 784,301 | 7/1935 | France | 244/91 |
| 12,820 | 10/1916 | United Kingdom | 244/91 |
| 1,152,982 | 5/1969 | United Kingdom | 244/130 |
| 460,636 | 2/1937 | United Kingdom | 244/91 |
| 664,288 | 1/1952 | United Kingdom | 244/30 |

*Primary Examiner*—Trygve M. Blix
*Assistant Examiner*—Galen L. Barefoot
*Attorney, Agent, or Firm*—Richard G. Geib

[57] ABSTRACT

A strake, or strakes, or faired simulation of same, mounted on a typical engine nacelle or similar wing mounted body to reduce or prevent the formation of vortices usually occurring with nacelle-wing combinations to improve the lift and drag characteristics of the combination and improve the stability of the aircraft since the undesireable variations of downwash changes over the tail surfaces are reduced or eliminated.

10 Claims, 5 Drawing Figures

MEANS TO REDUCE AND/OR ELIMINATE VORTICES, CAUSED BY WING BODY COMBINATIONS

FIELD OF INVENTION

This invention is applicable to structures extending forwardly of a wing or airfoil and/or over same.

SUMMARY OF INVENTION

In the development of the horizontally opposed engine and the over-the-wing jet engine, it became readily apparent that the bulky engine nacelle structure had many disadvantages. It then became obvious to redesign the engines and nacelles to present a minimum profile in order to reduce the drag on the aircraft and to maintain an aerodynamic symmetry for the aircraft. This was in an effort to improve the performance qualities and overall efficiency of the aircraft.

It has been observed that in such engine nacelle wing combinations and in fact in any wing body combination that a strong vortex or vortex pair is created at the juncture of same with the leading edge of the wing due to the spanwise lift distribution. As these vortices occur, lift, drag, and downwash aft of the wing mounted body exhibit erratic variations resulting in reduced stability and control of a typical aircraft. Attempts have been made to solve this problem by increasing the length of the engine nacelles while flattening them: However, this has caused added weight and cost.

It is to the specific improvement of a wing body combination that will reduce drag, improve aircraft longitudinal stability and provide a smoother progression of spanwise flow separation for a wing that this invention is addressed.

It is a more specific object of this invention to provide an improved engine nacelle structure shaped to fit around the engine that is maintained at both a minimum overall depth and length in advance of an airfoil to which it is aerodynamically faired.

A still more specific object of this invention is to provide strake means for wing-body combinations that will inhibit the spanwise lift distribution on an airfoil from rolling a vortex from the air flow around and over the junction at the leading edge of the wing of the body.

Also a further object of this invention is to maintain an aerodynamically clean wash of the empennage by the elimination of erratic variations of lift drag and downwash aft of a wing mounted body.

DRAWING DESCRIPTIONS

DESCRIPTION OF PREFERRED EMBODIMENTS

Figure 1:
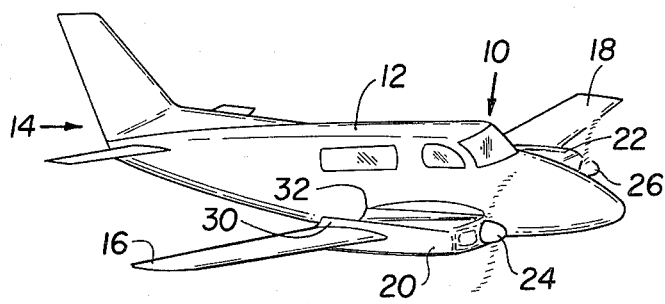
FIG. 1 is an illustration of a multi engined aircraft incorporating this invention on its engine nacelles.

Referring to the drawings in detail, there is shown an aircraft 10 having a fuselage 12 and empennage 14 to which are joined wings 16 and 18. The airplane is a twin engined airplane having engine nacelles 20 and 22 on opposite sides and spaced from the fuselage 12. Within the nacelles are engines having horizontally opposed cylinders for driving a propeller shaft (not shown) to in turn rotate a hub (not shown) within spinners 24 and 26 to thereby rotate propellers shown in revolution.

Figure 2:
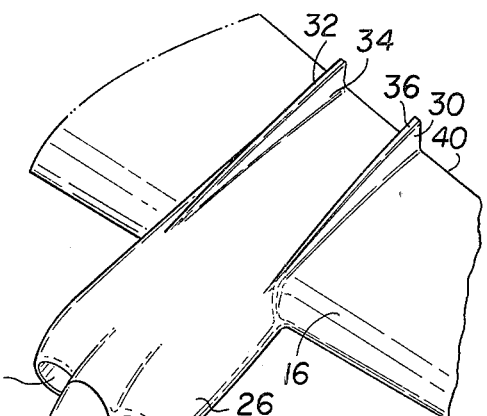
FIG. 2 is a partial front perspective view of a wing-engine nacelle combination according to this invention.
Figure 3:
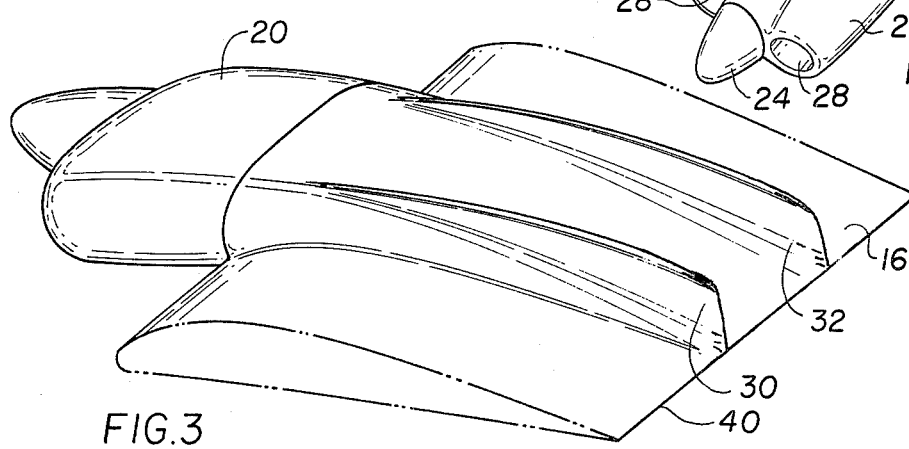
FIG. 3 is a partial aft perspective view of a wing-engine nacelle combination according to this invention.

The nacelle is of the pancake type now so commonly termed having a low profile (flat) frontal section 26 with air inlets 28 to either side of the spinner (see FIG. 2). Depending on the thickness of the wing 16 the nacelle could be of a thickness to be of the same frontal profile as the maximum thickness of the wing leading edge, as shown by FIG. 2, or of a greater thickness to be faired into the wing at its point of maximum thickness behind the leading edge, as shown by FIG. 3, or thicker than the wing to extend as a streamlined body above and below the wing, as shown by FIG. 1. In any event the nacelle has strake means in the form of fins or blended extensions 30 and 32 that are extensions of the nacelle sides from the juncture thereof with the wings 16 and 18 to the wing trailing edge. The fins have a chordwise attachment surface 34 (See FIG. 2) extending to the wing trailing edge 40 and an upper surface 36 that diverges from the nacelle and/or wing to a point at and above the trailing edge 40.

As shown by FIG. 3 the location of the strakes and their vertical profile is such that the airstream at the abrupt juncture of nacelle 20 with wing 16 will not be caused by span lift distribution to roll and spill over strake 30. Without this invention a spanwise flow separation over the wing 16 has occurred due to pressure distribution therealong and more specifically across the nacelle 20. By the constraint and guiding action of the strake means in counteracting what has heretofore been recognized as an adverse pressure distribution across such nacelle structures, heretofore lived with in aircraft design, there is caused a reduction in drag of such wing body combinations and a smoother design predictable progression of spanwise stalling of the wing. This improvement will also increase longitudinal stability of the aircraft in that the elimination of vortexes from the slipstream enables a stable wash of the empennage.

The problem addressed by this invention has been the repeated subject of pilot evaluation reports for over a decade in multi-engine aircraft that without this invention exhibit generally poor longitudinal stability in high lift, low speed conditions, such as when landing. Actually, existing nacelles, without this invention, particularly for the current horizontally opposed flat engines, exhibit sudden changes in lift, drag and downwash, and require higher landing speeds. Attempts within the prior art to address this problem were to lengthen the nacelle to allow an aerodynamic profile matching of nacelle and wing. Such attempts produced the "pancaked" nacelle. The use of strake means on a nacelle, as by this invention, enables the shortening of the "pancake" nacelle structure in that the lift distribution across the nacelle is rendered ineffective to constrain the airflow coming aft over the top, and up the sides of the nacelle forebody into an aerodynamically clean flow downwardly from the wing trailing edge in the aft direction. Therefore, shorter, lighter nacelles are possible.

Figure 4:
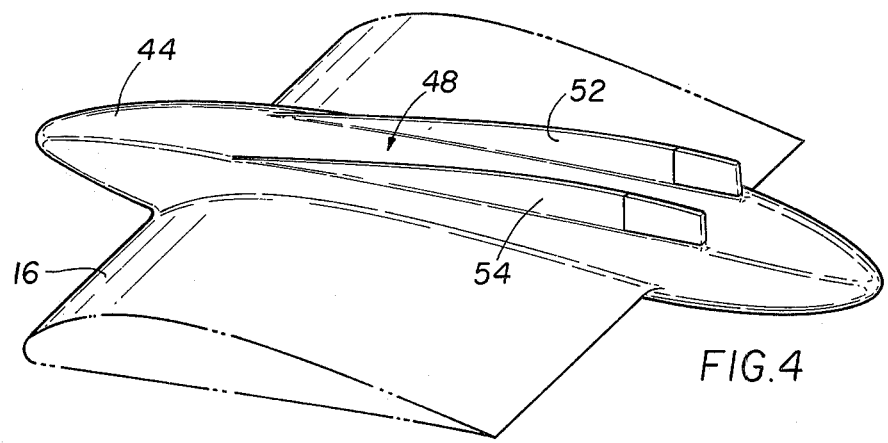
FIG. 4 is a partial aft perspective view of a wing-body combination according to this invention.
Figure 5:
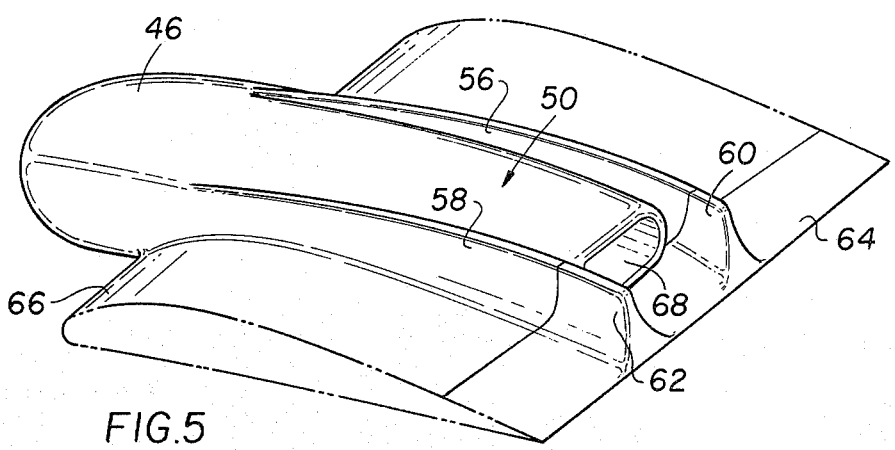
FIG. 5 is an aft perspective view of an over wing jet engine according to this invention.

As seen in FIGS. 4 and 5 this invention is equally applicable to the improvement of other wing-body combinations such as wing submerged fuel tank bodies 44 and over-the-wing jet engines 46. In each of these embodiments, as with those described above, the channels 48 and 50, respectively, are created by strakes 52, 54 or blended extensions 56, 58 from the bodies 44 or 46.

In FIG. 5 there is shown a design wherein the blended extensions 56 and 58 have movable trailing edges 60 and 62 so as to be operable with the movable surface 64 at the trailing edge of the wing 66. Also the channel 50 is created to be about the jet engine exhaust 68 so as to utilize its action to aspirate, to some extent, flow attachment within and along the strake means. It should also be noted that the trailing edges 60 and 62 will serve to relocate sound radiation from the exhaust nozzle 68 to the trailing edge of the wing after having had commingled therewith the surrounding airflow from channel 50.

Having now described what can only be said to be but a few practial embodiments for this invention it is now desired to set forth the scope of these Letters Patent by the appended claims.

What is claimed is:

1. An aircraft comprising:
    a fuselage having an empennage;
    wing means attached to said fuselage;
    at least two engine means one of which is mounted to said wing means on one side of said fuselage and another of which is mounted to said wing means on the other side of said fuselage, said engine means including nacelle structures having a portion forward of said wing means to form inboard and outboard shoulders with said wing means at the point of juncture thereof;
    strake means faired into said nacelle structures at said juncture and thereabove and extending in a diverging line aft thereof to its maximum height at a point adjacent the trailing edge of said wing means to eliminate spanwise vortices from stalling outer portions of said wings means said strake means includes two fins one of which is on the inboard edge of said nacelle and the other of which is on the outboard edge of said nacelle to form a channel therebetween that gradually deepens towards the trailing edge of said wing means.

2. The aircraft of claim 1 wherein the fins are blended into the inboard and outboard edges of said nacelle.

3. The aircraft of claim 1 wherein the engine means exhaust is within said channel.

4. The aircraft of claim 1 wherein the fins have movable aft portions operably associated with movable trailing edges of said wing means.

5. A wing-body combination comprising:
    a wing;
    a body attached to said wing, said body having a forward portion extending ahead of said wing; and
    channel forming means on an upper surface of said body beginning at the leading edge of said wing and ending at a trailing edge of said wing, said means being along spaced sides of said body.

6. The wing-body combination of claim 5 wherein the body is an engine nacelle.

7. The wing-body combination of claim 5 wherein the body is a wing submerged fuel tank.

8. The wing-body combination of claim 5 wherein the body extends along a chordal line of said wing.

9. The wing-body combination of claim 5 wherein the channel forming means is a pair of surfaces that diverge from a low heighth profile at the wing leading edge to a maximum height at the wing trailing edge.

10. A wing-body combination comprising:
    a wing;
    an attenuated body mounted to a wing to have a portion ahead of the leading edge of the wing, said body having a frontal profile defined by sides;
    strake means for said body beginning at the wing leading edge on at least one side of the body and extending throughout the chord of the wing while diverging from the wing to terminate at the trailing edge of the wing.

* * * * *